US006922480B2

(12) United States Patent
Rhoads

(10) Patent No.: US 6,922,480 B2
(45) Date of Patent: *Jul. 26, 2005

(54) METHODS FOR ENCODING SECURITY DOCUMENTS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/208,735

(22) Filed: Jul. 29, 2002

(65) Prior Publication Data

US 2003/0035565 A1 Feb. 20, 2003

Related U.S. Application Data

(63) Continuation of application No. 09/293,601, filed on Apr. 15, 1999, now Pat. No. 6,427,020, which is a continuation-in-part of application No. 09/234,780, filed on Jan. 20, 1999, now abandoned, which is a division of application No. 09/074,034, filed on May 6, 1998, now Pat. No. 6,449,377, which is a continuation-in-part of application No. 08/438,159, filed on May 8, 1995, now Pat. No. 5,850,481.
(60) Provisional application No. 60/082,228, filed on Apr. 16, 1998, and provisional application No. 60/071,983, filed on Jan. 20, 1998.

(51) Int. Cl.$^7$ ............................................... H04K 1/00
(52) U.S. Cl. ........................................ 382/137; 283/72
(58) Field of Search ................................. 382/100, 137, 382/232; 380/210, 287, 54; 713/176; 283/72, 92, 113, 57, 901, 902

(56) References Cited

U.S. PATENT DOCUMENTS

| | | | |
|---|---|---|---|
| 2,630,525 A | 3/1953 | Tomberlin et al. .............. 250/6 |
| 3,493,674 A | 2/1970 | Houghton .................... 178/5.6 |
| 3,562,420 A | 2/1971 | Thompson ...................... 178/6 |
| 3,576,369 A | 4/1971 | Wick et al. .................... 355/77 |
| 3,585,290 A | 6/1971 | Sanford ....................... 178/5.6 |
| 3,655,162 A | 4/1972 | Shoemaker ............. 249/219 W |
| 3,703,628 A | 11/1972 | Philipson, Jr. ......... 235/61.9 R |
| 3,805,238 A | 4/1974 | Rothfjell .............. 340/146.3 E |
| 3,809,806 A | 5/1974 | Walker et al. ................ 178/7.6 |
| 3,838,444 A | 9/1974 | Loughlin et al. ........ 178/5.2 R |
| 3,845,391 A | 10/1974 | Crosby ........................... 325/64 |
| 3,914,877 A | 10/1975 | Hines ............................. 35/2 |
| 3,918,567 A | 11/1975 | Kittredge .................... 197/1 R |
| 3,922,074 A | 11/1975 | Ikegami et al. ............. 350/320 |
| 3,969,830 A | 7/1976 | Grasham ......................... 35/2 |
| 3,971,917 A | 7/1976 | Maddox et al. ....... 235/61.11 E |
| 3,977,785 A | 8/1976 | Harris ......................... 355/133 |
| 3,982,064 A | 9/1976 | Barnaby ...................... 178/5.6 |
| 3,984,684 A | 10/1976 | Winnek ....................... 250/313 |
| 4,025,851 A | 5/1977 | Haselwood et al. .......... 325/31 |
| 4,164,745 A | 8/1979 | Cielo et al. ............. 346/140 R |
| 4,184,700 A | 1/1980 | Greenaway ..................... 283/6 |
| 4,225,967 A | 9/1980 | Miwa et al. .................. 455/68 |
| 4,230,990 A | 10/1980 | Lert, Jr. et al. ............... 455/67 |
| 4,231,113 A | 10/1980 | Blasbalg ....................... 455/29 |
| 4,237,484 A | 12/1980 | Brown et al. ................ 358/142 |
| 4,238,849 A | 12/1980 | Gassmann .................... 370/11 |
| 4,252,995 A | 2/1981 | Schmidt et al. ............. 179/160 |
| 4,262,329 A | 4/1981 | Bright et al. ................ 364/200 |
| 4,297,729 A | 10/1981 | Steynor et al. ............... 360/40 |
| 4,313,197 A | 1/1982 | Maxemchuk ................ 370/111 |

(Continued)

FOREIGN PATENT DOCUMENTS

| | | | |
|---|---|---|---|
| DE | 29 43 436 A1 | 5/1981 | .......... G06K/19/06 |
| DE | 3806414 A1 | 9/1989 | .......... G11B/23/28 |
| DE | 19521969 C1 | 2/1997 | ............. H04L/9/36 |

(Continued)

OTHER PUBLICATIONS

D.L. Hecht, "Embedded Data Glyph Technology for Hardcopy Digital Documents," Proc. Color Imaging: Device–Independent Color, Color Hardcopy and Graphic Arts III, SPIE—The Int'l Soc. Optical Engineering, Bellingham, Wash., vol. 2171, 1994 pp. 340–352.

D.L. Hecht, "Printed Embedded Data Graphical User Interfaces," 2001 Computer IEEE (vol. 34, No. 3), pp 47–55.

D.N. Curry, "Color Pictorial Serpentine Halftone for Secure Embedded Data," Proc. Optical Security and Counterfeit Deterrence Techniques II, SPIE—The Int'l Soc. Optical Engineering, Bellingham, Wash., vol. 3314, 1998, pp. 309–317.

(Continued)

*Primary Examiner*—Andrew W. Johns
(74) *Attorney, Agent, or Firm*—Digimarc Corporation

(57) ABSTRACT

Line art on a banknote or other security document is slightly changed to effect the encoding of plural-bit digital data (i.e. the banknote is digitally watermarked). When such a banknote is thereafter scanned, the resulting image data can be recognized as corresponding to a banknote by detection of the encoded data. (Alternatively, the image data can be recognized as corresponding to a banknote by machine detection of other forms of watermarking, or by reference to visible structures characteristic of banknotes.) In response to detection of a banknote, the detecting apparatus (e.g., a scanner, photocopier, or printer) can intervene so as to prevent or deter counterfeiting. For example, the apparatus can interrupt a copying operation, and display a message reminding the operator that it is illegal to reproduce currency. Another option is to dial a remote service and report the attempted reproduction of a banknote. Yet another option is to permit the copying, but to insert forensic tracer data (e.g. steganographically encoded binary data) in the resultant copy. The tracer data can memorialize the serial number of the machine that made the copy and/or the date and time the copy was made. To address privacy concerns, such tracer data is not normally inserted in photocopied output, but is so inserted only when the subject being photocopied is detected as being a banknote.

12 Claims, 3 Drawing Sheets

U.S. PATENT DOCUMENTS

| | | | |
|---|---|---|---|
| 4,367,488 A | 1/1983 | Leventer et al. | 358/147 |
| 4,379,947 A | 4/1983 | Warner | 179/160 |
| 4,389,671 A | 6/1983 | Posner et al. | 358/124 |
| 4,416,001 A | 11/1983 | Ackerman et al. | 369/44 |
| 4,423,415 A | 12/1983 | Goldman | 340/825.34 |
| 4,425,642 A | 1/1984 | Moses et al. | 370/76 |
| 4,425,661 A | 1/1984 | Moses et al. | 375/1 |
| 4,476,468 A | 10/1984 | Goldman | 340/825.034 |
| 4,495,620 A | 1/1985 | Steele et al. | 370/118 |
| 4,523,508 A | 6/1985 | Mayer et al. | 89/7 |
| 4,528,588 A | 7/1985 | Löfberg | 358/122 |
| 4,553,261 A | 11/1985 | Froessl | 382/57 |
| 4,571,489 A * | 2/1986 | Watanabe | 235/379 |
| 4,588,212 A | 5/1986 | Castagnoli | 283/91 |
| 4,590,366 A | 5/1986 | Rothfjell | 235/494 |
| 4,595,950 A | 6/1986 | Löfberg | 358/122 |
| 4,618,257 A | 10/1986 | Bayne et al. | 356/71 |
| 4,637,051 A | 1/1987 | Clark | 382/1 |
| 4,639,779 A | 1/1987 | Greenberg | 358/142 |
| 4,644,582 A | 2/1987 | Morishita et al. | 382/6 |
| 4,647,974 A | 3/1987 | Butler et al. | 358/185 |
| 4,654,867 A | 3/1987 | Labedz et al. | 379/59 |
| 4,660,221 A | 4/1987 | Dlugos | 380/23 |
| 4,660,859 A * | 4/1987 | Natesh | 283/70 |
| 4,663,518 A | 5/1987 | Borror et al. | 235/487 |
| 4,665,431 A | 5/1987 | Cooper | 358/145 |
| 4,672,605 A | 6/1987 | Hustig et al. | 370/76 |
| 4,677,435 A | 6/1987 | D'Agraives et al. | 340/825.31 |
| 4,677,466 A | 6/1987 | Lert, Jr. et al. | 358/84 |
| 4,682,794 A | 7/1987 | Margolin | 283/82 |
| 4,689,477 A | 8/1987 | Goldman | 235/380 |
| 4,697,209 A | 9/1987 | Kiewit et al. | 358/84 |
| 4,703,476 A | 10/1987 | Howard | 370/76 |
| 4,712,103 A | 12/1987 | Gotanda | 340/825.31 |
| 4,718,106 A | 1/1988 | Weinblatt | 455/2 |
| 4,723,149 A | 2/1988 | Harada | 355/14 R |
| 4,739,377 A * | 4/1988 | Allen | 355/133 |
| 4,750,173 A | 6/1988 | Blüthgen | 370/111 |
| 4,765,656 A | 8/1988 | Becker et al. | 283/70 |
| 4,775,901 A | 10/1988 | Nakano | 360/60 |
| 4,776,013 A | 10/1988 | Kafri et al. | 380/54 |
| 4,805,020 A | 2/1989 | Greenberg | 358/147 |
| 4,811,357 A | 3/1989 | Betts et al. | 375/1 |
| 4,811,408 A | 3/1989 | Goldman | 382/2 |
| 4,820,912 A | 4/1989 | Samyn | 235/449 |
| 4,835,517 A | 5/1989 | van der Gracht et al. | 340/310 A |
| 4,855,827 A | 8/1989 | Best | 358/143 |
| 4,864,618 A | 9/1989 | Wright et al. | 380/51 |
| 4,866,771 A | 9/1989 | Bain | 380/23 |
| 4,874,936 A | 10/1989 | Chandler et al. | 235/494 |
| 4,876,617 A | 10/1989 | Best et al. | 360/60 |
| 4,884,139 A | 11/1989 | Pommier | 358/142 |
| 4,885,632 A | 12/1989 | Mabey et al. | 358/84 |
| 4,903,301 A | 2/1990 | Kondo et al. | 381/30 |
| 4,908,836 A | 3/1990 | Rushforth et al. | 375/1 |
| 4,908,873 A | 3/1990 | Philibert et al. | 382/34 |
| 4,918,484 A | 4/1990 | Ujiie et al. | 355/41 |
| 4,920,503 A | 4/1990 | Cook | 364/521 |
| 4,921,278 A | 5/1990 | Shiang et al. | 283/87 |
| 4,939,515 A | 7/1990 | Adelson | 341/51 |
| 4,941,150 A | 7/1990 | Iwasaki | 375/1 |
| 4,943,093 A * | 7/1990 | Melling et al. | 283/83 |
| 4,943,973 A | 7/1990 | Werner | 375/1 |
| 4,943,976 A | 7/1990 | Ishigaki | 375/1 |
| 4,963,998 A | 10/1990 | Maufe | 360/60 |
| 4,965,827 A | 10/1990 | McDonald | 380/25 |
| 4,967,273 A | 10/1990 | Greenberg | 358/142 |
| 4,969,041 A | 11/1990 | O'Grady | 358/142 |
| 4,972,471 A | 11/1990 | Gross et al. | 380/3 |
| 4,972,475 A | 11/1990 | Sant'Anselmo | 380/54 |
| 4,972,476 A | 11/1990 | Nathans | 380/23 |
| 4,979,210 A | 12/1990 | Nagata et al. | 380/3 |
| 4,993,068 A | 2/1991 | Piosenka et al. | 380/23 |
| 4,996,530 A | 2/1991 | Hilton | 341/120 |
| 5,003,590 A | 3/1991 | Lechner et al. | 380/5 |
| 5,010,405 A | 4/1991 | Schreiber et al. | 358/141 |
| 5,034,982 A | 7/1991 | Heninger et al. | 380/54 |
| 5,036,513 A | 7/1991 | Greenblatt | 370/125 |
| 5,040,059 A | 8/1991 | Leberl | 358/107 |
| 5,062,666 A | 11/1991 | Mowry et al. | 283/67 |
| 5,063,446 A | 11/1991 | Gibson | 358/142 |
| 5,073,899 A | 12/1991 | Collier et al. | 375/1 |
| 5,073,925 A | 12/1991 | Nagata et al. | 380/3 |
| 5,075,773 A | 12/1991 | Pullen et al. | 358/141 |
| 5,077,608 A | 12/1991 | Dubner | 358/183 |
| 5,077,795 A | 12/1991 | Rourke et al. | 380/55 |
| 5,079,648 A | 1/1992 | Maufe | 360/31 |
| 5,083,224 A | 1/1992 | Hoogendoorn et al. | 360/60 |
| 5,091,966 A | 2/1992 | Bloomberg et al. | 382/21 |
| 5,103,459 A | 4/1992 | Gilhousen et al. | 375/1 |
| 5,113,437 A | 5/1992 | Best et al. | 380/3 |
| 5,128,525 A | 7/1992 | Stearns et al. | 235/454 |
| 5,134,496 A | 7/1992 | Schwab et al. | 358/335 |
| 5,144,660 A | 9/1992 | Rose | 380/4 |
| 5,146,457 A | 9/1992 | Veldhuis et al. | 370/111 |
| 5,148,498 A | 9/1992 | Resnikoff et al. | 382/54 |
| 5,150,409 A | 9/1992 | Elsner | 380/23 |
| 5,161,210 A | 11/1992 | Druyvesteyn et al. | 395/2 |
| 5,166,676 A | 11/1992 | Milheiser | 340/825.54 |
| 5,168,146 A | 12/1992 | Marshall et al. | 235/133 R |
| 5,178,418 A * | 1/1993 | Merry et al. | 283/73 |
| 5,185,736 A | 2/1993 | Tyrrell et al. | 370/55 |
| 5,199,081 A | 3/1993 | Saito et al. | 382/2 |
| 5,200,822 A | 4/1993 | Bronfin et al. | 358/142 |
| 5,212,551 A | 5/1993 | Conanan | 358/143 |
| 5,216,724 A | 6/1993 | Suzuki et al. | 382/7 |
| 5,228,056 A | 7/1993 | Schilling | 375/1 |
| 5,237,164 A | 8/1993 | Takada | 235/487 |
| 5,243,423 A | 9/1993 | DeJean et al. | 358/142 |
| 5,245,165 A | 9/1993 | Zhang | 235/454 |
| 5,245,329 A | 9/1993 | Gokcebay | 340/825.31 |
| 5,247,364 A | 9/1993 | Banker et al. | 358/191.1 |
| 5,253,078 A | 10/1993 | Balkanski et al. | 358/426 |
| 5,257,119 A * | 10/1993 | Funada et al. | 358/438 |
| 5,267,334 A | 11/1993 | Normille et al. | 382/56 |
| 5,278,400 A | 1/1994 | Appel | 235/494 |
| 5,280,537 A | 1/1994 | Sugiyama et al. | 375/1 |
| 5,284,364 A | 2/1994 | Jain | 283/87 |
| 5,291,243 A | 3/1994 | Heckman et al. | 355/201 |
| 5,293,399 A | 3/1994 | Hefti | 375/7 |
| 5,299,019 A | 3/1994 | Pack et al. | 358/261.3 |
| 5,305,199 A | 4/1994 | LoBiondo et al. | 364/403 |
| 5,315,098 A | 5/1994 | Tow | 235/494 |
| 5,315,448 A | 5/1994 | Ryan | 360/60 |
| 5,319,453 A | 6/1994 | Copriviza et al. | 348/6 |
| 5,319,724 A | 6/1994 | Blonstein et al. | 382/56 |
| 5,319,735 A | 6/1994 | Preuss et al. | 395/2.14 |
| 5,321,470 A | 6/1994 | Hasuo et al. | 355/201 |
| 5,321,773 A | 6/1994 | Kopec et al. | 382/30 |
| 5,325,167 A | 6/1994 | Melen | 356/71 |
| 5,327,237 A | 7/1994 | Gerdes et al. | 348/476 |
| 5,336,871 A | 8/1994 | Colgate, Jr. | 235/380 |
| 5,337,361 A * | 8/1994 | Wang et al. | 380/51 |
| 5,337,362 A | 8/1994 | Gormish et al. | 380/54 |
| 5,349,655 A | 9/1994 | Mann | 395/575 |
| 5,351,302 A | 9/1994 | Leighton et al. | 380/30 |
| 5,367,319 A | 11/1994 | Graham | 347/2 |
| 5,371,792 A | 12/1994 | Asai et al. | 380/3 |
| 5,374,976 A | 12/1994 | Spannenburg | 355/201 |
| 5,377,269 A | 12/1994 | Heptig et al. | 380/25 |

| | | | |
|---|---|---|---|
| 5,379,345 A | 1/1995 | Greenberg | 380/23 |
| 5,384,846 A | 1/1995 | Berson et al. | 380/23 |
| 5,387,941 A | 2/1995 | Montgomery et al. | 348/473 |
| 5,390,003 A * | 2/1995 | Yamaguchi et al. | 355/201 |
| 5,390,259 A | 2/1995 | Withgott et al. | 382/9 |
| 5,394,274 A | 2/1995 | Kahn | 360/27 |
| 5,396,559 A | 3/1995 | McGrew | 380/54 |
| 5,398,283 A | 3/1995 | Virga | 380/18 |
| 5,404,160 A | 4/1995 | Schober et al. | 348/1 |
| 5,404,377 A | 4/1995 | Moses | 375/200 |
| 5,408,542 A | 4/1995 | Callahan | 382/56 |
| 5,410,598 A | 4/1995 | Shear | 380/4 |
| 5,416,307 A | 5/1995 | Danek et al. | 235/449 |
| 5,418,853 A | 5/1995 | Kanota et al. | 380/5 |
| 5,422,963 A | 6/1995 | Chen et al. | 382/232 |
| 5,422,995 A | 6/1995 | Aoki et al. | 395/162 |
| 5,424,807 A | 6/1995 | Ohmura | 355/201 |
| 5,425,100 A | 6/1995 | Thomas et al. | 380/20 |
| 5,426,710 A | 6/1995 | Suzuki et al. | 382/135 |
| 5,428,606 A | 6/1995 | Moskowitz | 370/60 |
| 5,430,664 A * | 7/1995 | Cargill et al. | 364/550 |
| 5,432,542 A | 7/1995 | Thibadeau et al. | 348/6 |
| 5,432,870 A | 7/1995 | Schwartz | 382/232 |
| 5,434,427 A | 7/1995 | Crane et al. | 250/556 |
| 5,436,653 A | 7/1995 | Ellis et al. | 348/2 |
| 5,436,974 A | 7/1995 | Kovanen | 380/51 |
| 5,437,897 A | 8/1995 | Tanaka et al. | 428/29 |
| 5,444,779 A | 8/1995 | Daniele | 380/3 |
| 5,446,273 A | 8/1995 | Leslie | 235/487 |
| 5,446,488 A | 8/1995 | Vogel | 348/3 |
| 5,449,895 A | 9/1995 | Hecht et al. | 235/494 |
| 5,450,122 A | 9/1995 | Keene | 348/1 |
| 5,450,490 A | 9/1995 | Jensen et al. | 380/6 |
| 5,453,968 A | 9/1995 | Veldhuis et al. | 369/84 |
| 5,461,426 A | 10/1995 | Limberg et al. | 348/475 |
| 5,469,222 A | 11/1995 | Sprague | 348/580 |
| 5,469,506 A | 11/1995 | Berson et al. | 380/23 |
| 5,471,533 A | 11/1995 | Wang et al. | 380/51 |
| 5,473,631 A | 12/1995 | Moses | 375/202 |
| 5,479,168 A | 12/1995 | Johnson et al. | 341/110 |
| 5,481,294 A | 1/1996 | Thomas et al. | 348/1 |
| 5,483,602 A | 1/1996 | Stenzel et al. | 382/135 |
| 5,483,658 A | 1/1996 | Grube et al. | 395/800 |
| 5,488,664 A | 1/1996 | Shamir | 380/54 |
| 5,499,294 A | 3/1996 | Friedman | 380/10 |
| 5,500,856 A | 3/1996 | Nagase et al. | 370/18 |
| 5,510,900 A | 4/1996 | Shirochi et al. | 358/335 |
| 5,513,011 A | 4/1996 | Matsumoto et al. | 358/341 |
| 5,513,260 A | 4/1996 | Ryan | 380/3 |
| 5,515,081 A | 5/1996 | Vasilik | 345/189 |
| 5,521,372 A | 5/1996 | Hecht et al. | 235/494 |
| 5,521,722 A | 5/1996 | Colvill et al. | 358/500 |
| 5,524,933 A | 6/1996 | Kunt et al. | 283/67 |
| 5,526,427 A | 6/1996 | Thomas et al. | 380/20 |
| 5,530,751 A | 6/1996 | Morris | 380/4 |
| 5,530,759 A | 6/1996 | Braudaway et al. | 380/54 |
| 5,532,920 A | 7/1996 | Hartrick et al. | 364/419.1 |
| 5,533,144 A | 7/1996 | Fan | 382/135 |
| 5,537,216 A | 7/1996 | Yamashita et al. | 358/335 |
| 5,537,223 A | 7/1996 | Curry | 358/460 |
| 5,539,471 A | 7/1996 | Myhrvold et al. | 348/473 |
| 5,539,735 A | 7/1996 | Moskowitz | 370/60 |
| 5,539,841 A | 7/1996 | Huttenlocher et al. | 382/218 |
| 5,541,662 A | 7/1996 | Adams et al. | 348/460 |
| 5,541,741 A | 7/1996 | Suzuki | 358/450 |
| 5,544,255 A | 8/1996 | Smithies et al. | 382/119 |
| 5,548,646 A | 8/1996 | Aziz et al. | 380/23 |
| 5,550,932 A | 8/1996 | Blaylock et al. | 382/139 |
| 5,557,333 A | 9/1996 | Jungo et al. | 348/473 |
| 5,557,742 A | 9/1996 | Smaha et al. | 395/186 |
| 5,559,559 A | 9/1996 | Jungo et al. | 348/432 |
| 5,568,179 A | 10/1996 | Diehl et al. | 348/6 |
| 5,568,268 A | 10/1996 | Tsuji et al. | 358/296 |
| 5,568,550 A | 10/1996 | Ur | 380/3 |
| 5,568,570 A | 10/1996 | Rabbani | 382/238 |
| 5,572,010 A | 11/1996 | Petrie | 235/494 |
| 5,572,247 A | 11/1996 | Montgomery et al. | 348/10 |
| 5,574,787 A | 11/1996 | Ryan | 380/5 |
| 5,576,532 A | 11/1996 | Hecht | 235/494 |
| 5,579,124 A | 11/1996 | Aijala | 386/96 |
| 5,581,800 A | 12/1996 | Fardeau et al. | 455/2 |
| 5,582,103 A | 12/1996 | Tanaka et al. | 101/32 |
| 5,583,614 A | 12/1996 | Hasuo et al. | 355/201 |
| 5,587,743 A | 12/1996 | Montgomery et al. | 348/473 |
| 5,590,197 A | 12/1996 | Chen et al. | 380/24 |
| 5,602,920 A | 2/1997 | Bestler et al. | 380/49 |
| 5,606,609 A | 2/1997 | Houser et al. | 380/4 |
| 5,611,575 A | 3/1997 | Petrie | 283/67 |
| 5,612,943 A | 3/1997 | Moses et al. | 369/124 |
| 5,613,004 A | 3/1997 | Cooperman et al. | 380/28 |
| 5,613,012 A | 3/1997 | Hoffman et al. | 382/115 |
| 5,614,940 A | 3/1997 | Cobbley et al. | 348/7 |
| 5,617,148 A | 4/1997 | Montgomery | 348/473 |
| 5,627,655 A | 5/1997 | Okamoto et al. | 386/94 |
| 5,629,770 A | 5/1997 | Brassil et al. | 358/261.1 |
| 5,629,980 A | 5/1997 | Stefik et al. | 380/4 |
| 5,633,952 A | 5/1997 | Outa et al. | 382/165 |
| 5,636,292 A | 6/1997 | Rhoads | 382/232 |
| 5,638,446 A | 6/1997 | Rubin | 380/25 |
| 5,640,467 A | 6/1997 | Yamashita et al. | 382/181 |
| 5,646,997 A | 7/1997 | Barton | 380/23 |
| 5,647,010 A | 7/1997 | Okubo et al. | 382/100 |
| 5,649,054 A | 7/1997 | Oomen et al. | 395/2.38 |
| 5,652,626 A | 7/1997 | Kawakami et al. | 348/463 |
| 5,652,802 A | 7/1997 | Graves et al. | 382/135 |
| 5,659,726 A | 8/1997 | Sandford, II et al. | 395/612 |
| 5,661,574 A | 8/1997 | Kawana | 358/501 |
| 5,663,766 A | 9/1997 | Sizer, II | 348/473 |
| 5,663,952 A | 9/1997 | Gentry, Jr. | 370/252 |
| 5,666,487 A | 9/1997 | Goodman et al. | 395/200.76 |
| 5,671,277 A | 9/1997 | Ikenoue et al. | 380/7 |
| 5,678,155 A | 10/1997 | Miyaza | 399/366 |
| 5,687,236 A | 11/1997 | Moskowitz et al. | 380/28 |
| 5,689,623 A | 11/1997 | Pinard | 395/106 |
| 5,692,073 A | 11/1997 | Cass | 382/219 |
| 5,694,471 A | 12/1997 | Chen et al. | 380/25 |
| 5,708,717 A | 1/1998 | Alasia | 380/51 |
| 5,710,636 A | 1/1998 | Curry | 358/298 |
| 5,710,834 A | 1/1998 | Rhoads | 382/232 |
| 5,712,920 A | 1/1998 | Spille | 381/104 |
| 5,719,984 A | 2/1998 | Yamagata et al. | 386/95 |
| 5,721,788 A * | 2/1998 | Powell et al. | 382/100 |
| 5,727,092 A | 3/1998 | Sandford, II et al. | 382/251 |
| 5,735,547 A | 4/1998 | Morelle et al. | 283/67 |
| 5,737,025 A | 4/1998 | Dougherty et al. | 348/473 |
| 5,739,864 A | 4/1998 | Copeland | 348/473 |
| 5,745,604 A | 4/1998 | Rhoads | 382/232 |
| 5,748,763 A | 5/1998 | Rhoads | 382/115 |
| 5,748,783 A | 5/1998 | Rhoads | 382/232 |
| 5,751,854 A | 5/1998 | Saitoh et al. | 382/218 |
| 5,761,686 A | 6/1998 | Bloomberg | 707/529 |
| 5,764,763 A | 6/1998 | Jensen et al. | 380/6 |
| 5,768,426 A | 6/1998 | Rhoads | 382/232 |
| 5,772,249 A | 6/1998 | Guex et al. | 283/93 |
| 5,774,452 A | 6/1998 | Wolosewicz | 370/212 |
| 5,778,102 A | 7/1998 | Sandford, II et al. | 382/251 |
| 5,790,693 A | 8/1998 | Graves et al. | 382/135 |
| 5,790,697 A | 8/1998 | Munro et al. | 382/135 |
| 5,790,932 A | 8/1998 | Komaki et al. | 399/366 |
| 5,796,824 A | 8/1998 | Hasebe et al. | 380/4 |
| 5,817,205 A | 10/1998 | Kaule | 156/233 |
| 5,822,448 A | 10/1998 | Graves et al. | 382/135 |

| Patent Number | Date | Inventor | Class |
|---|---|---|---|
| 5,822,463 A | 10/1998 | Yokose et al. ............... 382/251 |
| 5,825,892 A | 10/1998 | Braudaway et al. ........... 380/51 |
| 5,832,119 A | 11/1998 | Rhoads ........................ 382/232 |
| 5,838,814 A | 11/1998 | Moore .......................... 382/115 |
| 5,841,886 A | 11/1998 | Rhoads ........................ 382/115 |
| 5,843,564 A | 12/1998 | Gasper et al. ............... 428/211 |
| 5,850,481 A | 12/1998 | Rhoads ........................ 382/232 |
| 5,857,038 A | 1/1999 | Owada et al. ................ 382/284 |
| 5,864,622 A | 1/1999 | Marcus ........................ 380/23 |
| 5,871,615 A | 2/1999 | Harris ......................... 162/140 |
| 5,901,224 A | 5/1999 | Hecht ............................. 380/4 |
| 5,905,810 A | 5/1999 | Jones et al. ................. 382/135 |
| 5,907,443 A | 5/1999 | Hirata ........................... 360/60 |
| 5,949,903 A | 9/1999 | Outa et al. .................. 382/165 |
| 5,951,055 A | 9/1999 | Mowry, Jr. .................... 283/93 |
| 5,960,151 A | 9/1999 | Takahashi ..................... 386/94 |
| 5,974,548 A * | 10/1999 | Adams ........................ 713/200 |
| 5,982,956 A | 11/1999 | Lahmi ......................... 382/306 |
| 5,991,500 A | 11/1999 | Kanota et al. ................ 386/94 |
| 6,024,287 A | 2/2000 | Takai et al. .................. 235/493 |
| 6,081,345 A | 6/2000 | Curry ........................... 358/1.9 |
| 6,086,706 A | 7/2000 | Brassil et al. ............... 156/277 |
| 6,095,566 A | 8/2000 | Yamamoto et al. ........... 283/75 |
| 6,104,812 A | 8/2000 | Koltai et al. .................. 380/51 |
| 6,141,752 A | 10/2000 | Dancs et al. ................. 713/172 |
| 6,166,750 A | 12/2000 | Negishi ........................ 347/131 |
| 6,185,683 B1 * | 2/2001 | Ginter et al. ................. 713/176 |
| 6,188,787 B1 | 2/2001 | Ohmae et al. ................ 382/165 |
| 6,212,285 B1 | 4/2001 | Bender et al. ............... 382/100 |
| 6,724,912 B1 | 4/2001 | Carr et al. ................... 382/100 |
| 5,337,361 C1 * | 5/2001 | Wang et al. ................... 380/51 |
| 6,243,480 B1 | 6/2001 | Zhao et al. .................. 382/100 |
| 6,252,963 B1 | 6/2001 | Rhoads ........................ 380/54 |
| 6,285,776 B1 | 9/2001 | Rhoads ........................ 382/100 |
| 6,289,108 B1 | 9/2001 | Rhoads ........................ 382/100 |
| 6,292,092 B1 | 9/2001 | Chow et al. .................. 340/5.6 |
| 6,301,360 B1 | 10/2001 | Bocionek et al. ............. 380/28 |
| 6,321,648 B1 | 11/2001 | Berson et al. ................. 101/32 |
| 6,321,981 B1 | 11/2001 | Ray et al. .................... 235/380 |
| 6,332,031 B1 | 12/2001 | Rhoads et al. .............. 382/100 |
| 6,343,138 B1 * | 1/2002 | Rhoads ........................ 382/100 |
| 6,343,204 B1 | 1/2002 | Yang ............................ 399/366 |
| 6,345,104 B1 * | 2/2002 | Rhoads ........................ 382/100 |
| 6,359,985 B1 | 3/2002 | Koch et al. .................... 380/54 |
| 6,427,020 B1 | 7/2002 | Rhoads ........................ 382/100 |
| 6,449,377 B1 | 9/2002 | Rhoads ........................ 382/100 |
| 6,487,301 B1 | 11/2002 | Zhao ............................ 382/100 |
| 6,522,771 B2 | 2/2003 | Rhoads ........................ 382/100 |
| 6,546,112 B1 | 4/2003 | Rhoads ........................ 382/100 |
| 6,549,638 B2 | 4/2003 | Davis et al. ................. 382/100 |
| 6,580,819 B1 * | 6/2003 | Rhoads ........................ 382/135 |
| 6,674,886 B2 | 1/2004 | Davis et al. ................. 382/135 |
| 2001/0017709 A1 | 8/2001 | Murakami et al. ......... 358/1.14 |
| 2001/0022848 A1 | 9/2001 | Rhoads ........................ 382/100 |
| 2001/0024510 A1 | 9/2001 | Iwamura .................... 382/100 |
| 2001/0026629 A1 | 10/2001 | Oki .............................. 382/100 |
| 2001/0030759 A1 | 10/2001 | Hayashi et al. .............. 358/1.9 |
| 2001/0053299 A1 | 12/2001 | Matsunoshita et al. ..... 399/366 |
| 2002/0003891 A1 | 1/2002 | Hoshino ...................... 382/100 |
| 2002/0018228 A1 | 2/2002 | Torigoe ...................... 358/1.14 |
| 2002/0051237 A1 | 5/2002 | Ohara ........................ 358/468 |
| 2004/0060990 A1 | 4/2004 | Hilton et al. ................. 235/494 |
| 2004/0061326 A1 | 4/2004 | Hilton et al. ................. 283/72 |
| 2004/0061327 A1 | 4/2004 | Hilton et al. ................. 283/72 |
| 2004/0075869 A1 | 4/2004 | Hilton et al. ................ 358/3.28 |
| 2004/0078333 A1 | 4/2004 | Hilton et al. ................. 705/45 |

FOREIGN PATENT DOCUMENTS

| | | | | |
|---|---|---|---|---|
| EP | 0058482 B1 | 6/1985 | .......... | H04M/11/06 |
| EP | 0234885 B1 | 4/1991 | ............ | B41M/3/10 |
| EP | 0441702 A1 | 8/1991 | ........... | G11B/20/00 |
| EP | 0 493 091 A1 * | 7/1992 | .......... | H04N/1/387 |
| EP | 0 551 016 A1 | 7/1993 | .......... | H04N/1/387 |
| EP | 0581317 A2 | 2/1994 | ........... | G07D/7/00 |
| EP | 0 319 524 B1 | 6/1994 | ........... | G07D/7/00 |
| EP | 0605208 A2 | 7/1994 | ............ | H04N/1/46 |
| EP | 0 178 132 B2 | 8/1994 | ........... | G07D/7/00 |
| EP | 0629972 A2 | 12/1994 | ........... | G06K/15/02 |
| EP | 0372601 B1 | 2/1995 | ........... | H04B/1/66 |
| EP | 0418964 B1 | 2/1995 | ........... | G11B/20/00 |
| EP | 0366381 B1 | 3/1995 | ........... | H04H/1/00 |
| EP | 0649074 A1 | 4/1995 | ........... | G03G/21/02 |
| EP | 0 649 114 A2 | 4/1995 | ........... | G06K/9/68 |
| EP | 0650146 A1 | 4/1995 | ........... | G07C/9/00 |
| EP | 0 651 337 A1 | 5/1995 | ........... | G06F/15/70 |
| EP | 0651554 A1 | 5/1995 | ........... | H04N/1/21 |
| EP | 0 664 642 A2 | 7/1995 | .......... | H04N/1/387 |
| EP | 0411232 B1 | 12/1995 | ........... | H04N/1/411 |
| EP | 0 506 332 B1 | 12/1996 | ........... | G03G/21/00 |
| EP | 0 751 474 A2 | 1/1997 | ........... | G06K/9/46 |
| EP | 0 751 663 A2 | 1/1997 | ........... | H04N/1/00 |
| EP | 0766449 A2 | 4/1997 | ........... | H04N/1/00 |
| EP | 0789270 A1 | 8/1997 | ........... | G03C/5/08 |
| EP | 0789480 A2 | 8/1997 | ........... | H04N/1/00 |
| EP | 0 800 123 A2 | 10/1997 | ........... | G03G/21/04 |
| EP | 0 731 961 B1 | 5/1998 | ........... | G07D/7/00 |
| EP | 0590884 B1 | 6/1998 | ........... | H04N/1/00 |
| EP | 0 590 884 B1 | 6/1998 | ........... | H04N/1/00 |
| EP | 0 612 042 B1 | 6/1998 | ........... | G07D/7/00 |
| EP | 0 522 769 B1 | 9/1998 | ........... | H04N/1/00 |
| EP | 0 691 632 B1 | 10/1998 | ........... | G07D/7/00 |
| EP | 0 617 545 B1 | 1/1999 | ........... | H04N/1/00 |
| EP | 0 891 070 A1 | 1/1999 | ........... | H04N/21/04 |
| EP | 0642060 B1 | 4/1999 | ........... | G03G/15/01 |
| EP | 0 733 958 B1 | 5/1999 | .......... | G03G/21/00 |
| EP | 0 921 675 A2 | 6/1999 | ........... | H04N/1/32 |
| EP | 0 932 115 A2 | 7/1999 | ........... | G06K/9/46 |
| EP | 0705025 A1 | 3/2000 | ........... | H04N/1/60 |
| EP | 0711061 B1 | 5/2001 | ........... | H04N/1/00 |
| EP | 1122939 A2 | 8/2001 | ........... | H04N/1/00 |
| GB | 2063018 A | 5/1981 | ........... | H04M/11/06 |
| GB | 2067871 A | 7/1981 | ............ | H04N/7/16 |
| GB | 2196167 A | 4/1988 | ........... | G11B/20/08 |
| GB | 2204984 A | 11/1988 | ........... | G11B/23/28 |
| GB | 2346110 A | 8/2000 | ............ | B41M/3/14 |
| JP | 3-185585 A | 8/1991 | .......... | G06K/17/00 |
| JP | 4-248771 A | 9/1992 | ............ | H04N/1/44 |
| JP | 5-242217 A | 9/1993 | ............ | G06F/15/62 |
| JP | 8-30759 A | 2/1996 | ............ | G06T/1/00 |
| WO | WO 89/08915 A1 | 9/1989 | ........... | G11B/20/10 |
| WO | WO91/19614 A1 | 12/1991 | ............ | B42D/15/10 |
| WO | WO93/25038 A1 | 12/1993 | ............ | H04N/1/00 |
| WO | WO95/04665 A1 | 2/1995 | ............ | B44F/1/12 |
| WO | WO95/10813 A1 | 4/1995 | ......... | G06F/15/403 |
| WO | WO95/10835 A1 | 4/1995 | ........... | G11B/31/00 |
| WO | WO95/14289 A2 | 5/1995 | ........... | G06K/19/14 |
| WO | WO95/20291 A1 | 7/1995 | ........... | H04N/1/32 |
| WO | WO96/16381 A1 | 5/1996 | ........... | G07D/7/00 |
| WO | WO96/26494 A1 | 8/1996 | ........... | G06F/17/30 |
| WO | WO96/27259 A1 | 9/1996 | ........... | H04N/1/32 |
| WO | WO 96/31049 | 10/1996 | ............ | H04N/1/44 |
| WO | WO96/36163 A2 | 11/1996 | ............ | H04N/1/32 |
| WO | WO97/00578 A1 | 1/1997 | ........... | H04N/7/167 |
| WO | WO97/43736 A1 | 11/1997 | ........... | G06K/9/36 |
| WO | WO 99/17486 | 4/1999 | ........... | H04N/1/00 |
| WO | WO 99/35819 | 7/1999 | ........... | H04N/1/32 |
| WO | WO 99/36879 | 7/1999 | ........... | G06K/9/00 |
| WO | WO01/08405 A1 | 2/2001 | ........... | H04N/1/32 |
| WO | WO02/065381 A1 | 8/2002 | ........... | G06K/9/18 |
| WO | WO02/065382 A1 | 8/2002 | ........... | G06K/9/18 |

| | | | | |
|---|---|---|---|---|
| WO | WO02/065383 A1 | 8/2002 | ............ | G06K/9/18 |
| WO | WO02/065384 A1 | 8/2002 | ............ | G06K/9/18 |
| WO | WO02/065385 A1 | 8/2002 | ............ | G06K/9/18 |

OTHER PUBLICATIONS

"Specification for an Image Replacement Document—IRD," Draft Standard for Trial Use, DSTU X9.90–2003, Jan. 10, 2003.

U.S. Appl. No. 09/465,418, filed Dec. 16, 1999, Rhoads et al.

U.S. Appl. No. 09/765,102, filed Jan. 17, 2001, Shaw.

"Access Control and COpyright Protection for Images, WorkPackage 1: Access Control and Copyright Protection for Images Need Evaluation," Jun., 1995, 21 pages.

"Access Control and COpyright Protection for Images: WorkPackage 3: Evaluation of Existing Systems," Apr. 19, 1995, 68 pages.

"Access Control and COpyright Protection for Images, WorkPackage 8: Watermarking," Jun. 30, 1995, 46 pages.

Arachelian, "White Noise Storm," Apr. 11, 1994, Internet reference, 13 pages.

Arazi, et al., "Intuition, Perception, and Secure Communication," IEEE Transactions on Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Bender, "Applications for Data Hiding," IBM Systems Journal, vol. 39, No. 3–4, pp. 547–568, 2000.

Bender, Techniques for Data Hiding, Proc. SPIE, Vo. 2420, Feb. 9, 1995, pp. 164–173.

Bender et al., "Techniques for Data Hiding," Massachusetts Institute of Technology, Media Laboratory, Draft Preprint, Apr. 13, 1995, 10 pages.

Boland, "Watermarking Digital Images for Copyright Protection," Fifth International Conf. on Image Processing and Its Applications, Conf. Publ. No. 410, pp. 326–330, 1995.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brassil et al., "Hiding Information in Document Images," Mar., 1995, pp. 482–489, Cont. on Information Sciences and Systems.

Brassil et al., "Electronic Marking and Identification Techniques to Discourage Document Copying," IEEE Proc. INFOCOM'94, Jun. 1994, pp. 1278–1287.

Brown, "S–Tool for Windows, Version 1.00; What is Steganography," Internet reference, Mar. 6, 1994, 6 pages.

Bruckstein et al., A holographic transform domain image watermarking method, Circuits, Systems, and Signal Processing vol. 17, No. 3 p. 361–389, 1998. This paper includes an appendix containing an internal memo of Bell Labs, which according to the authors of the paper, was dated Sep. 1994.

Bruyndonckx et al., "Spatial Method for Copyright Labeling of Digital Images," preprint dated 1994; published in IEEE Workshop on Nonlinear Images/Signal Processing, Thessaloniki, Greece, Jun. 1995, Proceedings, pp. 456–459.

Bruyndonckx et al., Neural Network Post–Processing of Coded Images Using Perceptual Masking, 1994, 3 pages.

Burgett et al., "A Novel Method for Copyright Labeling Digitized Image Data," requested by e–mail from author (unavailable/password protected on IGD WWW site); received Sep. 18, 1995, 12 pages.

Caronni, "Assuring Ownership Rights for Digital Images," Published in the Proceedings of 'Reliable IT Systems,' VIS '95, HH. Bruggermann and W. Gerhardt–Hackl (Ed.), Vieweg Publishing Company, Germany, 1995, Jun. 14, 1994, 10 pages. (Orginally published as an ETH (Zurich) Technical Report, "Ermitteln Unauthorisierter Verteiler von Maschinenlesbaren Daten," 8/93.

Caruso, "Digital Commerce, 2 plans for watermarks, which can bind proof of authorship to electronic works." New York Times, Aug. 7, 1995, one page.

Choudhury, et al., "Copyright Protection for Electronic Publishing over Computer Networks," IEEE Network Magazine, Jun. 1994, 18 pages.

Chow et al., "Forgerv and Tamper–Proof Identification Document." IEEE Proc. 1993 Int. Carnahan Conf. on Security Technology, Oct. 13–15, 1993, pp 11–14.

Clarke, "Invisible Code Tags Electronic Images," Electronic Engineering Times, Jun. 12, 1995, n. 852, p. 42.

"Copyright Protection for Digital Images, Digital Fingerprinting from FBI," Highwater FBI brochure 1995, 4 pages.

Cox et al., "Secure Spread Watermarking for Multimedia, "NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference Recor, pp. 192–197, 1996.

"Cyphertech Systems: Introduces Digital Encoding Device to Prevent TV Piracy," Hollyood Reporter, Oct. 20, 1993, p. 23.

Dautzberg, "Watermarking Images," Department of Microelectronics and Electrical Engineering, Trinity College Dublin, 47 pages, Oct. 1994.

de Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Digimarc presentation at RSA Conference, approximately Jan. 17, 1996, 4 pages.

Fitzgerald, "Invisible Digital Copyright ID," Editor & Publisher, Jun. 25, 1994, p. 62.

"Foiling Card Forgers With Magnetic Noise," Wall Street Journal, Feb. 8, 1994.

Franz et al., "Computer Based Steganography: How It Works and Why Therefore Any Restrictions on Cryptography are Nonsense, at Best," Information Hiding, First Int. Workshop Proc, May 30–Jun. 1, 1996, pp. 7–21, (a counterpart was published in German by Steffen Moller et al in 1994).

Frequently Asked Questions About Digimarc Signature Technology, Aug. 1, 1995, http://www.digimarc.com, 9 pages.

Friedman, "The Trustworthy Digital Camera: Restoring Credibility to the Photographic Image," IEEE Transactions on Consumer Electronic, vol. 39, No. 4, Nov. 1993, pp. 905–910.

Gabor, et al., "Theory of Communication," J. Inst. Elect. Eng. 93, 1946, pp. 429–441.

Gerzon, M.A., et al, "A High–Rate Buried–Data Channel for Audio CD," Journal of the Audio Engineering Society, vol. 43, No.1–2, p. 3–22, Jan.–Feb., 1995.

Gonzalez et al, Digital image processing, Addison–Wesley publishing company, pp. 663–681, Sep. 1993.

Gruhl et al., Information Hiding to Foil the Casual Counterfeiter, Information Hiding, 2d Int'l Workshop, pp. 1–15, Apr. 1998.

Hartung et al., Digital Watermarking of Raw and Compressed Video, Proc. SPIE 2952, Digital Compression Technologies and Systems for Video Communications, Oct., 1996, pp. 205–213.

Haslop, "Security Printing Techniques," Optical Document Security, edited by R.L. van Renesse, Artech House, 1994, pp. 111–126.*

Hecht, "Embedded Data Glyph Technology for Hardcopy Digital Documents," SPIE vol. 2171, Feb. 1994, pp. 341–352.

"Holographic signatures for digital images,"The Seybold Report on Desktop Publishing, Aug. 1995, one page.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johnson, "Steganography," Dec. 10, 1995, 32 pages.

JPEG Group's JPEG Software (release 4), ftp.csua.berekley.edu/pub/cypherpunks/applications/jsteg/jpeg.announcement.gz, Jun. 7, 1993, 2 pages.

Kassam, Signal Detection in Non–Gaussian Noise, Dowden & Culver, 1988, pp. 1–96.

Kawaguchi et al., "Principle and Applications of BPCS–Steganography," Proc. SPIE vol. 3528: Multimedia Systems and Applications, Nov. 2–4, 1998, pp. 464–473.

Kochi et al., "Copyright Protection for Multimedia Data," Proc. of the International Conference on Digital Media and Electronic Publishing, Dec. 6–8, 1994, Leeds, U.K., 15 pages.

Komatsu et al., "Authentication System Using Concealed Image in Telematics," Memoirs of the School of Science & Engineering, Waseda Univ., No. 52, 1988, pp. 45–60.*

Komatsu et al., "A Proposal on Digital Watermark in Document Image Communication and Its Application to Realize a Signature," Electronics and Communications in Japan, Part 1, vol. 73, No. 5, 1990, pp. 22–33.

Kurak et al., "A Cautionary Note On Image Downgrading," Nov. 30, 1992 IEEE, pp. 153–159.

Low et al., "Document Marking and Indentification using Both Line and Word Shifting," IEEE Proc. INFOCOM'95, Apr. 1995, pp. 853–860.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matsui et al., "Embedding a Watermark to Binary Pictures in Hardcopy System," Memoirs of the National Defense Academy, Japan, vol. 36, No. 2, (1997), pp. 13–20.

Matsui et al., "Use of the Wavelet Transformation to Embed Signatures in Images," Systems and Computers in Japan, Jan., 1997, vol. 28, No. 1, pp. 87–94.

Matsui et al., "Video–Steganography How to Secretly Embed a Signature in a Picture," IMA Intellectual Property Project Proceedings, Jan. 1994, vol. 1, Issue 1, pp. 187–205.

Matthews, "When Seeing is Not Believing," New Scientist, Oct. 16, 1993, pp. 13–15.

Maxemchuk, "Electronic Document Distribution," AT&T Tech. J., Sep. 1994, pp. 73–80.

Müller, et al., "Rechnergestutzte Steganographic: Wie sie Funktionert und warum folglich jede Reglementierung von Verschlusselung unsinnig ist," (with English abstract), Datenschutz und Datensicherung, 18/6 (1994) 318–326.

"NAB–Cyphertech Start Anti–Piracy Broadcast Test, "Newsbytes, NEW032300023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–521.

Oomen, A. et al., "A Variable–Bit Rate Buried–Data Channel for Compact Disc," Journal of the Audio Engineering Society vol. 43, No. 1–2, pp. 23–28, Jan.–Feb., 1995.

ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEEE Proceedings–Vision, Image and Signal Processing, vol. 143, No. 4, pp. 250–256).

O Ruanaidh et al., "Rotation, Scale and Translation Invariant Digital Image Watermarking," IEEE Proc. Int. Conf. on Image Processing, Oct. 26–29, 1997, pp 536–539.

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Proudler, Graeme J., "Authentication and Display of Signatures on Electronic Documents," 2244 Research Disclosure, Feb., 1994, No. 358, Emsworth, GB, 1 page.

Quisquater, J., "Access Control and COpyright Protection for Images, Conditional Access and Copyright Protection Based on the Use of Trusted Third Parties," 1995, 43 pages.

Roberts, "Picture Coding Using Pseudorandom Noise," IRE Trans. on Information Theory, vol. 8, No. 2, Feb., 1962, pp. 145–154.

Sapwater et al., "Electronic Copyright Protection," Photo<Electronic Imaging, vol. 37, No. 6, 1994, pp. 16–21.

Schell, "The Historical Development of Security Printing: Design and Technology," Optical Document Security, R.L. van Renesse, ed., Artech House, 1994, pp. 75–93.*

Schneider, "Digital Signatures, Cryptographic Algorithms Can Create Nonforgeable Signatures for Electronic Documents, Making Them Valid Legal Instruments"BYTE, Nov. 1993, pp. 309–312.

Schreiber et al., "A Compatible High–Definition Television System Using the Noise–Margin Method of Hiding Enhancement Information," SMPTE Journal, Dec. 1989, pp. 873–879.

shaggy@phantom.com, "Hide and Seek v. 4.0," Internet reference, Apr. 10, 1994, 3 pages.

Sheng et al., "Experiments on Pattern Recognition Using Invariant Fourier–Mellin Descriptors," Journal of Optical Society of America, vol. 3, No. 6, Jun., 1986, pp. 771–776.

Short, "Steps Toward Unmasking Secure Communications," International Journal of Bifurcation and Chaos, vol. 4, No. 4, 1997, pp. 959–977.

Simmons, "Subliminal Channels; Past and Present," ETT, vol. 5, No. 4, Jul.–Aug. 1994, pp. 45–59.

Sklar, "A Structured Overview of Digital Communications—a Tutorial Review—Part II," IEEE Communications Magazine, Oct., 1983, pp. 6–21.

Sklar, "A Structured Overview of Digital Communications—a Tutorial Review—Part I," IEEE Communications Magazine, Aug., 1983, pp. 1–17.

Spannenburg, "Modulation of Printed Gratings as a Protection Against Copying," Optical Document Security, R.L. van Renesse, ed., Artech House, 1994, pp. 127–148.*

"Steganography," Intellectual Property and the National Information Infrastructure The Report of the Working Group on Intellectual Property Rights, Sep. 1995, pp. 212–213.

Szepanski, "Compatibility Problems in Add–On Data Transmission for TV–Channels," 2d Symp. and Tech. Exh. On Electromagnetic Compatibility, Jun. 28, 1977, pp. 263–268.

Szepanski, "Optimization of Add–On Signals by Means of a Modified Training Algorithm for Linear Classifiers," IEEE Int'l Symp. On Info. Theory, Oct. 10, 1977, pp. 27–28.

Szepanski, "Binary Data Transmission Over Video Channels with Very Low Amplitude Data Signals," Fernseh– und Kino–Technik, vol. 32, No. 7, Jul. 1978, pp. 251–256. (German text with full English translation).

Szepanski, Additive Binary Data Transmission for Video Signals, Conference of the Communications Engineering Society, 1980, NTG Technical Reports, vol. 74, pp. 343–351. (German text with full English translation).

Tanaka et al., "New Integrated Codings Schemes for Computer–Aided Facsimile," Proc. IEEE Int'l Conf. on Sys. Integration, Apr. 1990, pp. 275–281.

Tanaka et al., "Embedding Secret Information Into a Dithered Multi–Level Image," Proc. IEEE Military Comm. Conf., Sep. 1990, pp. 216–220.

Tanaka et al., "A Visual Retreival System with Private Information for Image Database," International Conference on DSP Applications and Technology, Oct. 1991, pp. 415–421.

Tanaka, "Embedding the Attribute Information Into a Dithered Image," Systems and Computers in Japan, vol. 21, No. 7, 1990, pp. 43–50.

Tirkel et al., "Electronic Water Mark," DICTA–93, Macquarie University, Sydney, Australia, Dec., 1993, pp. 666–673.

Tirkel et al., "A Two–Dimensional Digital Watermark," 1995, 6 pages.

Toga et al., "Registration Revisited," Journal of Neuroscience Methods, 48 (1993), pp. 1–13.

van Schyndel et al., "A Digital Watermark," IEEE International Conference on Image Processing, Nov. 13–16, 1994, pp. 86–90.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

Weber et al., "Correlative Image Registration," Seminarss in Nuclear Medicine, vol. XXIV, No. 4, (Oct.), 1994, pp. 311–323.

Wise, "The History of Copyright, Photographers' Rights Span Three Centuries," Photo<Electronic Imaging, vol. 37, No. 6, 1994.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

Szepanski, "A Signal Theoretic Method for Creating Forgery–Proof Documents for Automatic Verification," *Proceedings 1979 Carnahan Conference on Crime Countermeasures*, May 16, 1979, pp. 101–109.

Gale, "Zero–Order Grating Microstructures," *Optical Document Security*, R.L. van Renesse, ed., Artech House, 1994, pp. 187–205.

Gruhl, "Information Hiding to Foil the Casual Counterfeiter," *Proc. $2^{nd}$ Int'l Workshop on Information Hiding*, Apr. 14–17, 1998, pp. 1–15.

* cited by examiner

METHODS FOR ENCODING SECURITY DOCUMENTS

RELATED APPLICATION DATA

This application is a continuation of application Ser. No. 09/293,601, filed Apr. 15, 1999, now U.S. Pat. No. 6,427,020, which is a divisional application of utility application Ser. No. 09/074,034, filed May 6, 1998, now U.S. Pat. No. 6,449,377, which is a continuation-in-part of application Ser. No. 08/438,159, filed May 8, 1995 (now U.S. Pat. No. 5,850,481), and copending provisional application 60/082,228, filed Apr. 16, 1998.

Application Ser. No. 09/293,601 is also a continuation-in-part of application Ser. No. 09/234,780, filed Jan. 20, 1999, now abandoned, which claims priority to provisional application 60/071,983, filed Jan. 20, 1998.

(The specification of application Ser. No. 08/438,159 is substantially identical to that of applicant's issued U.S. Pat. Nos. 5,636,292, 5,710,834, 5,748,763, 5,748,783. The specification of application 60/082,228 is attached hereto as Appendix A.)

Patent application Ser. No. 09/293,602, entitled Methods for Identifying Equipment Used in Counterfeiting, was filed as a sibling application of parent application Ser. No. 09/293,601.

The subject matter of this application is also related to that of the present assignee's other applications, namely Ser. No. 08/508,083 (now U.S. Pat. No. 5,841,978), Ser. No. 08/534,005 (now U.S. Pat. No. 5,832,119), Ser. No. 08/637,531 (now U.S. Pat. No. 5,822,436), Ser. No. 08/649,419 (now U.S. Pat. No. 5,862,260), Ser. No. 08/746,613 (now U.S. Pat. No. 6,122,403), Ser. No. 08/951,858 (now U.S. Pat. No. 6,026,193), and Ser. No. 08/969,072 (now U.S. Pat. No. 5,809,160), and the allowed applications referenced below.

FIELD OF THE INVENTION

The present invention relates to methods and devices for recognizing banknotes and responding accordingly (e.g., by intervening to prevent attempted banknote counterfeiting).

BACKGROUND AND SUMMARY OF THE INVENTION

Watermarking is a quickly growing field of endeavor, with several different approaches. The present assignee's work is reflected in U.S. Pat. Nos. 5,710,834, 5,636,292, 5,721,788, 5,748,763, 5,748,783, and 5,745,604, in allowed U.S. applications Ser. No. 08/327,426 (now U.S. Pat. No. 5,768,426), Ser. No. 08/508,083 (now U.S. Pat. No. 5,841,978), Ser. No. 08/438,159 (now U.S. Pat. No. 5,850,481), and in laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Watermarking can be applied to myriad forms of information. The present disclosure focuses on its applications to line art imagery, of the sort typically employed in banknotes, travelers checks, passports, stock certificates, and the like (hereafter collectively referred to as "banknotes"). However, it should be recognized that the principles discussed below can also be applied outside this particular field.

Most of the prior art in image watermarking has focused on pixelated imagery (e.g. bit-mapped images, JPEG/MPEG imagery, VGA/SVGA display devices, etc.). In most watermarking techniques, the luminance or color values of component pixels are slightly changed to effect subliminal encoding of binary data through the image. (This encoding can be done directly in the pixel domain, or in another domain, such as the DCT domain.) In some systems, isolated pixels are changed in accordance with one or more bits of the binary data; in others, plural domain-related groupings of pixels (e.g. locally adjoining, or corresponding to a given DCT component) are so changed. In all cases, however, pixels have served as the ultimate carriers of the embedded data.

While pixelated imagery is a relatively recent development, line art goes back centuries. One familiar example is U.S. paper currency. On the one dollar banknote, for example, line art is used in several different ways. One is to form intricate webbing patterns around the margin of the note (generally comprised of light lines on dark background). Another is so form grayscale imagery, such as the portrait of George Washington (generally comprised of dark lines on a light background).

In an illustrative embodiment of the present invention, the line art on a banknote or other security document is slightly changed to effect the encoding of plural-bit digital data (i.e. the banknote is digitally watermarked). When such a banknote is thereafter scanned, the resulting image data can be recognized as corresponding to a banknote by detection of the encoded data. (Alternatively, the image data can be recognized as corresponding to a banknote by machine detection of other forms of watermarking, or by reference to visible structures characteristic of banknotes.)

In response to detection of a banknote, the detecting apparatus (e.g., a scanner, photocopier, or printer) can intervene so as to prevent or deter counterfeiting. For example, the apparatus can interrupt a copying operation, and display a message reminding the operator that it is illegal to reproduce currency. Another option is to dial a remote service and report the attempted reproduction of a banknote. Yet another option is to permit the copying, but to insert forensic tracer data (e.g. steganographically encoded binary data) in the resultant copy. The tracer data can memorialize the serial number of the machine that made the copy and/or the date and time the copy was made. To address privacy concerns, such tracer data is not normally inserted in photocopied output, but is so inserted only when the subject being photocopied is detected as being a banknote.

The foregoing features and advantages of the invention will be more readily apparent from the following detailed description, which proceeds with reference to the accompanying drawings.

DETAILED DESCRIPTION

Figure 1A:
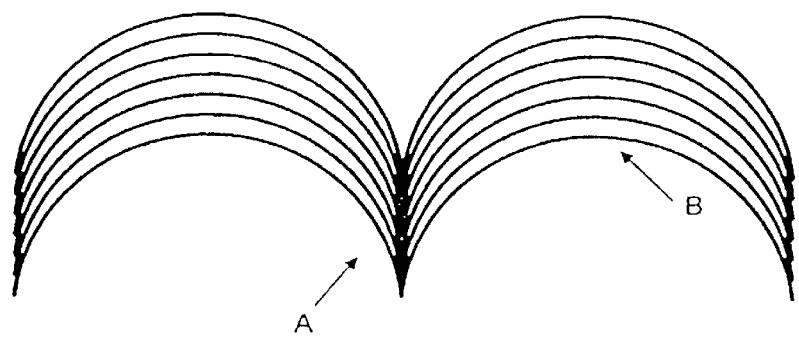
FIGS. 1A and 1B show prior art techniques for achieving grayscale effects using line art.
Figure 1B:
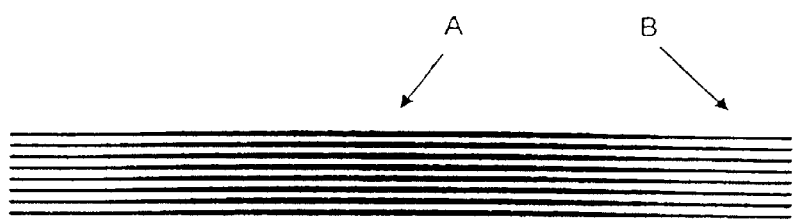
Figure 2:
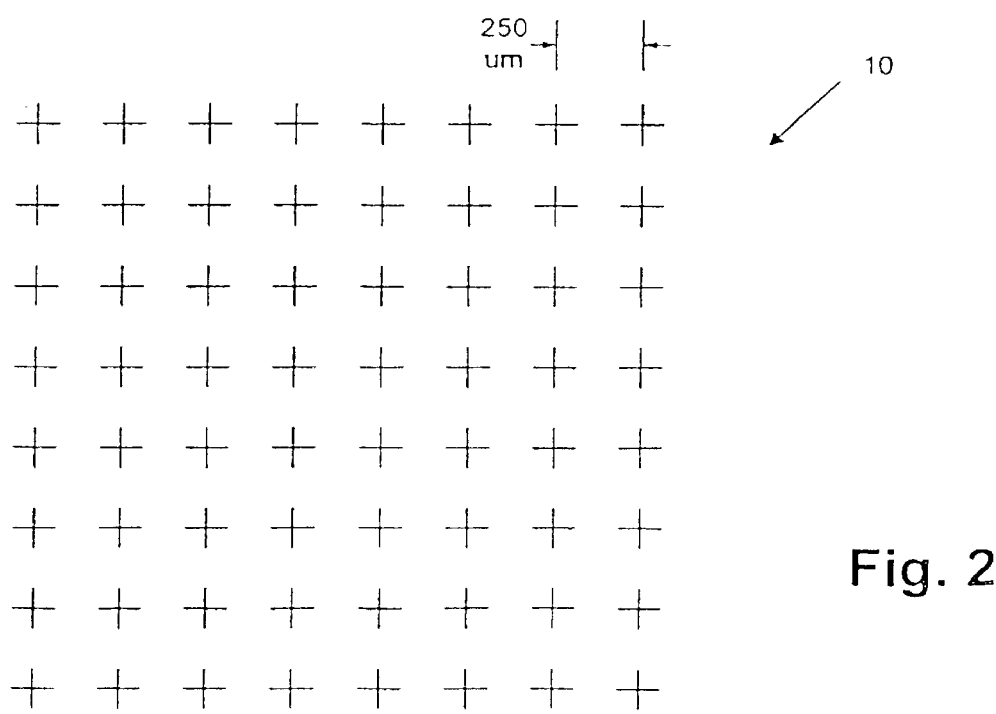
FIG. 2 shows a virtual array of grid points that can be imposed on an image according to one embodiment of the present invention.

Referring to FIG. 2, an illustrative form of the invention employs a grid 10 of imaginary reference points arrayed over a line art image. The spacing between points is 250 μm in the illustrated arrangement, but greater or lesser spacings can of course be used.

Figure 3:
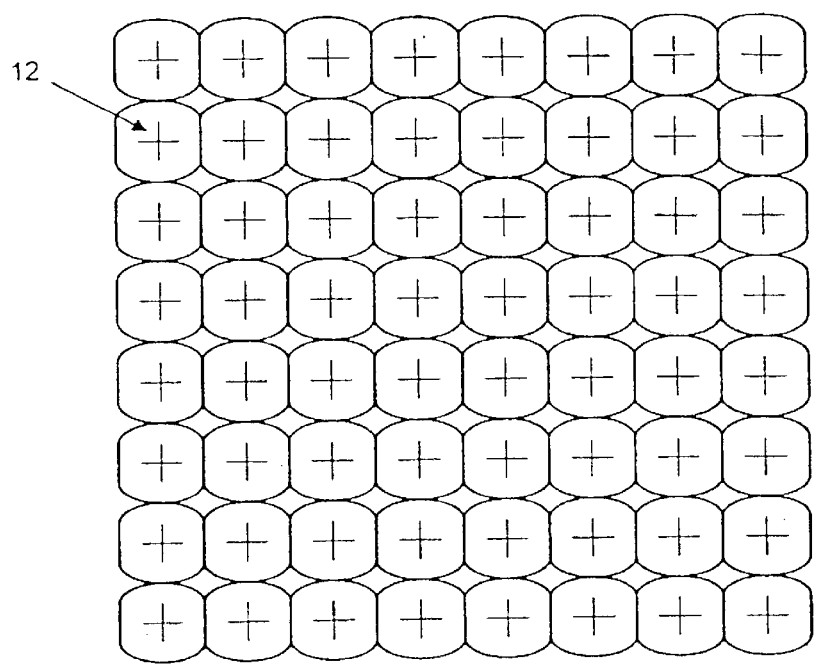
FIG. 3 shows a virtual array of regions that can be imposed on an image according to the FIG. 2 embodiment.

Associated with each grid point is a surrounding region 12, shown in FIG. 3. As described below, the luminosity (or reflectance) of each of these regions 12 is slightly changed to effect the subliminal encoding of binary data.

Region 12 can take various shapes; the illustrated rounded-rectangular shape is representative only. (The illustrated shape has the advantage of encompassing a fairly large area while introducing fewer visual artifacts than, e.g., square regions.) In other embodiments, squares, rectangles, circles, ellipses, etc., can alternatively be employed.

Figures 4, 5, 6:
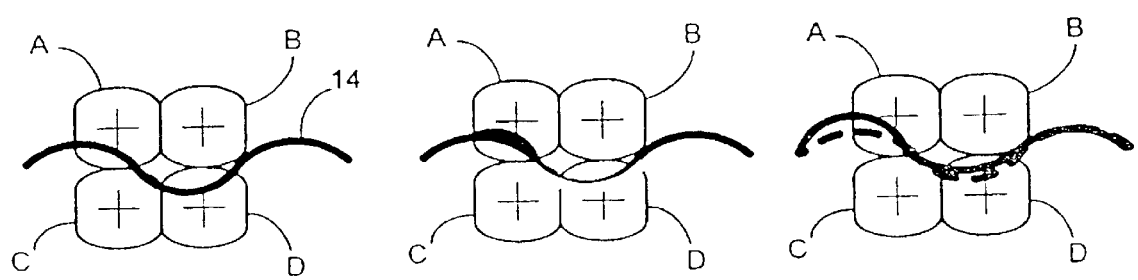
FIG. 4 shows an excerpt of FIG. 3 with a line from a line art image passing therethrough.
FIG. 5 shows changes to the width of the line of FIG. 3 to effect watermark encoding according to one embodiment of the present invention.
FIG. 6 shows changes to the position of the line of FIG. 3 to effect watermark encoding according to another embodiment of the present invention.

FIG. 4 is a magnified view of an excerpt of FIG. 3, showing a line 14 passing through the grid of points. The width of the line, of course, depends on the particular image of which it is a part. The illustrated line is about 25 μm in width; greater or lesser widths can naturally be used.

In a first embodiment of the invention, shown in FIG. 5, the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image.

In an exemplary algorithm, the binary data is represented as a sequence of −1s and 1s, instead of 0s and 1s. (The binary data can comprise a single datum, but more typically comprises several. In an illustrative embodiment, the data comprises 100 bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in U.S. Pat. No. 5,710,834.)

In FIG. 5, the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the watermarking algorithm redundantly encodes each bit of data in sub-parts spaced throughout the line art image.

The changes to line widths in regions A and D of FIG. 5 are exaggerated for purposes of illustration. While the illustrated variance is possible, most implementations will modulate the line width 3–50% (increase or decrease).

(Many watermarking algorithms routinely operate within a signal margin of about +/−1% changes in luminosity to effect encoding. That is, the "noise" added by the encoding amounts to just 1% or so of the underlying signal. Lines typically don't occupy the full area of a region, so a 10% change to line width may only effect a 1% change to region luminosity, etc. Banknotes are different from photographs in that the art need not convey photorealism. Thus, banknotes can be encoded with higher energy than is used in watermarking photographs, provided the result is still aesthetically satisfactory. To illustrate, localized luminance changes on the order of 10% are possible in banknotes, while such a level of watermark energy in photographs would generally be considered unacceptable. In some contexts, localized luminance changes of 20, 30, 50 or even 100% are acceptable.)

In the illustrated embodiment, the change to line width is a function solely of the tweak to be applied to a single region. Thus, if a line passes through any part of a region to which a tweak of 2% is to be applied, the line width in that region is changed to effect the 2% luminance difference. In variant embodiments, the change in line width is a function of the line's position in the region. In particular, the change in line width is a function of the distance between the region's center grid point and the line's closest approach to that point. If the line passes through the grid point, the full 2% change is effected. At successively greater distances, successively less change is applied. The manner in which the magnitude of the tweak changes as a function of line position within the region can be determined by applying one of various interpolation algorithms, such as the bi-linear, bi-cubic, cubic splines, custom curve, etc.

In other variant embodiments, the change in line width in a given region is a weighted function of the tweaks for adjoining or surrounding regions. Thus, the line width in one region may be increased or decreased in accordance with a tweak value corresponding to one or more adjoining regions.

Combinations of the foregoing embodiments can also be employed.

In the foregoing embodiments, it is sometimes necessary to trade-off the tweak values of adjoining regions. For example, a line may pass along a border between regions, or pass through the point equidistant from four grid points ("equidistant zones"). In such cases, the line may be subject to conflicting tweak values—one region may want to increase the line width, while another may want to decrease the line width. (Or both may want to increase the line width, but differing amounts.) Similarly in cases where the line does not pass through an equidistant zone, but the change in line width is a function of a neighborhood of regions whose tweaks are of different values. Again, known interpolation functions can be employed to determine the weight to be given the tweak from each region in determining what change is to be made to the line width in any given region.

In the exemplary watermarking algorithm, the average change in luminosity across the image is zero, so no generalized lightening or darkening of the image is apparent. The localized changes in luminosity are so minute in magnitude, and localized in position, that they are essentially invisible (e.g. inconspicuous/subliminal) to human viewers.

An alternative embodiment is shown in FIG. 6, in which line position is changed rather than line width.

In FIG. 6 the original position of the line is shown in dashed form, and the changed position of the line is shown in solid form. To decrease a region's luminosity, the line is moved slightly closer to the center of the grid point; to increase a region's luminosity, the line is moved slightly away. Thus, in region A, the line is moved towards the center grid point, while in region D it is moved away.

It will be noted that the line on the left edge of region A does not return to its nominal (dashed) position as it exits the region. This is because the region to the left of region A also is to have decreased luminosity. Where possible, it is generally preferable not to return a line to its nominal position, but instead permit shifted lines to remain shifted as they enter adjoining regions. So doing permits a greater net line movement within a region, increasing the embedded signal level.

Again, the line shifts in FIG. 6 are somewhat exaggerated. More typical line shifts are on the order of 3–50 $\mu$m.

One way to think of the FIG. 6 embodiment is to employ a magnetism analogy. The grid point in the center of each region can be thought of as a magnet. It either attracts or repels lines. A tweak value of −3, for example, may correspond to a strong-valued attraction force; a tweak value of +2 may correspond to a middle-valued repulsion force, etc. In FIG. 6, the grid point in region A exhibits an attraction force (i.e. a negative tweak value), and the grid point in region D exhibits a repulsion force (e.g. a positive tweak value).

The magnetic analogy is useful because the magnetic effect exerted on a line depends on the distance between the line and the grid point. Thus, a line passing near a grid point is shifted more in position than a line near the periphery of the region.

Each of the variants discussed above in connection with FIG. 5 is likewise applicable to FIG. 6.

Combinations of the embodiments of FIGS. 5 and 6 can of course be used, resulting in increased watermark energy, better signal-to-noise ratio and, in many cases, less noticeable changes.

In still a further embodiment, the luminance in each region is changed while leaving the line unchanged. This can be effected by sprinkling tiny dots of ink in the otherwise-vacant parts of the region. In high quality printing, of the type used with banknotes, droplets on the order of 3 $\mu$m in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.)

In a variant of the speckling technique, very thin mesh lines can be inserted in the artwork—again to slightly change the luminance of one or more regions.

Although not previously mentioned, it is contemplated that the banknote will include some manner of calibration information to facilitate registration of the image for decoding. This calibration information can be steganographic or overt. Several techniques for steganographically embedding calibration information are disclosed in my prior patents and applications. Other techniques can be found in others of the cited work.

To decode watermark data, the encoded line art image must be converted into electronic form for analysis. This conversion is typically performed by a scanner.

Scanners are well known, so a detailed description is not provided here. Suffice it to say that scanners conventionally employ a line of closely spaced photodetector cells that produce signals related to the amount of the light reflected from successive swaths of the image. Most inexpensive consumer scanners have a resolution of 300 dots per inch (dpi), or a center to center spacing of component photodetectors of about 84 $\mu$m. Higher quality scanners of the sort found in most professional imaging equipment and photocopiers have resolutions of 600 dpi (42 $\mu$m), 1200 dpi (21 $\mu$m), or better.

Taking the example of a 300 dpi scanner (84 $\mu$m photodetector spacing), each 250 $\mu$m region 12 on the banknote will correspond to about a 3×3 array of photodetector samples. Naturally, only in rare instances will a given region be physically registered with the scanner so that nine photodetector samples capture the luminance in that region, and nothing else. More commonly, the line art is skewed with respect to the scanner photodetectors, or is longitudinally misaligned (i.e. some photodetectors image sub-parts of two adjoining regions). However, since the scanner oversamples the regions, the luminance of each region can unambiguously be determined.

In one embodiment, the scanned data from the line art is collected in a two dimensional array and processed— according to one of the techniques disclosed in my prior patents and applications—to detect the embedded calibration information. The array is then processed to effect a virtual re-registration of the image data. A software program then analyzes the statistics of the re-registered data (using the techniques disclosed in my prior writings) to extract the bits of the embedded data.

(Again, the reference to my earlier watermark decoding techniques is exemplary only. Once scanning begins and the data is available in pixel form, it is straightforward to apply any other watermark decoding technique to extract a correspondingly-encoded watermark.)

In a variant embodiment, the scanned data is not assembled in a complete array prior to the processing. Instead, it is processed in real-time, as it is generated, in order to detect embedded watermark data without delay. (Depending on the parameters of the scanner, it may be necessary to scan a half-inch or so of the line art image before the statistics of the resulting data unambiguously indicate the presence of a watermark.)

In accordance with another aspect of the invention, various hardware devices are provided with the capability to recognize embedded watermark data in any line art images they process, and to respond accordingly.

One example is a color photocopier. Such devices employ a color scanner to generate sampled (pixel) data corresponding to an input media (e.g. a dollar bill). If watermark data associated with a banknote is detected, the photocopier can take one or more steps.

One option is simply to interrupt copying, and display a message reminding the operator that it is illegal to reproduce currency.

Another option is to dial a remote service and report the attempted reproduction of a banknote. Photocopiers with dial-out capabilities are known in the art (e.g. U.S. Pat. No. 5,305,199) and are readily adapted to this purpose. The remote service can be an independent service, or can be a government agency.

Figure 7:
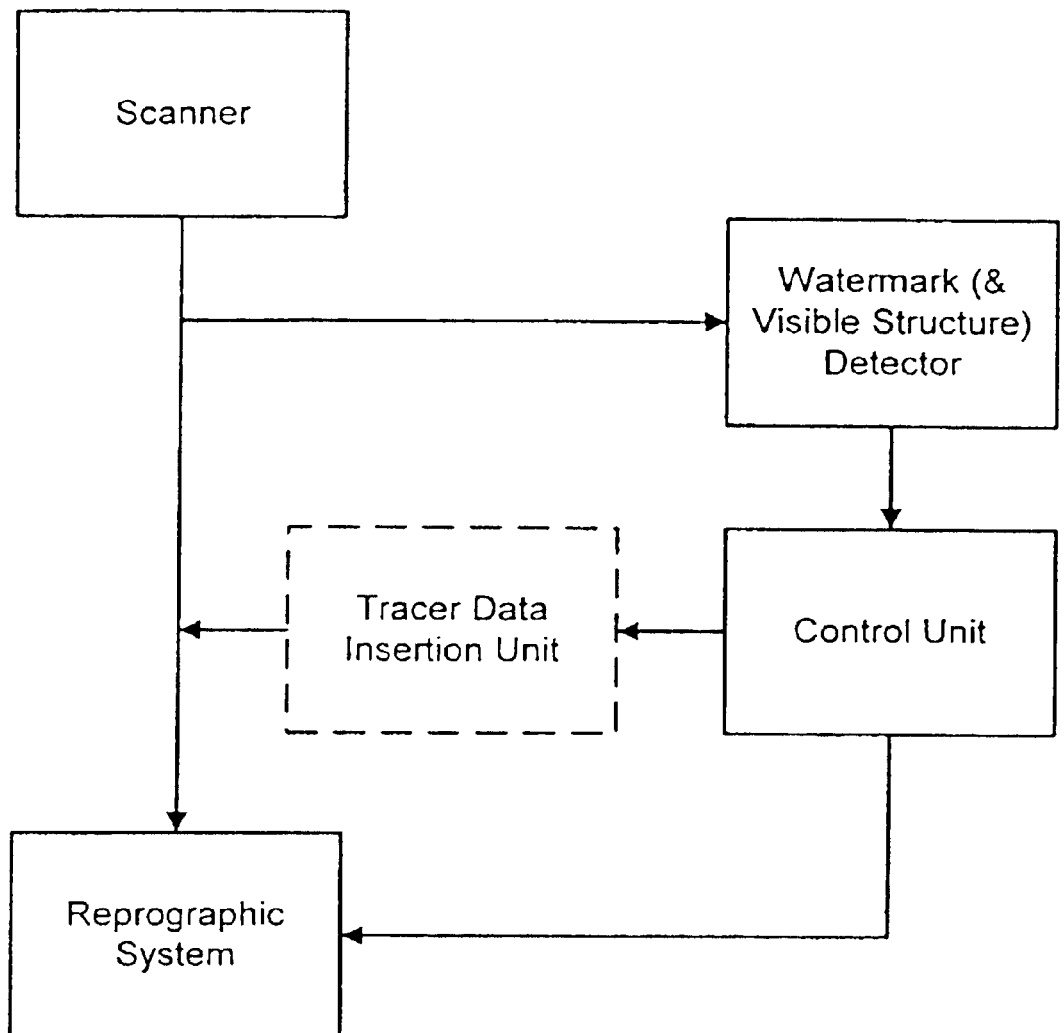
FIG. 7 is a block diagram of a photocopier according to another embodiment of the invention.

Yet another option is to permit the copying, but to insert forensic tracer data in the resultant copy. This tracer data can take various forms. Steganographically encoded binary data is one example. An example is shown in U.S. Pat. No. 5,568,268. The tracer data can memorialize the serial number of the machine that made the copy and/or the date and time the copy was made. To address privacy concerns, such tracer data is not normally inserted in photocopied output, but is so inserted only when the subject being photocopied is detected as being a banknote. (Such an arrangement is shown in FIG. 7.)

Desirably, the scan data is analyzed on a line-by-line basis in order to identify illicit photocopying with a minimum of delay. If a banknote is scanned, one or more lines of scanner output data may be provided to the photocopier's reprographic unit before the banknote detection decision has been made. In this case the photocopy will have two regions: a first region that is not tracer-marked, and a second, subsequent region in which the tracer data has been inserted.

Photocopiers with other means to detect not-to-be-copied documents are known in the art, and employ various response strategies. Examples are detailed in U.S. Pat. Nos. 5,583,614, 4,723,149, 5,633,952, 5,640,467, and 5,424,807.

Another hardware device that can employ the foregoing principles is a standalone scanner. A programmed processor (or dedicated hardware) inside the scanner analyzes the data being generated by the device, and responds accordingly.

Yet another hardware device that can employ the foregoing principles is a printer. A processor inside the device analyzes graphical image data to be printed, looking for watermarks associated with banknotes.

For both the scanner and printer devices, response strategies can include disabling operation, or inserting tracer information. (Such devices typically do not have dial-out capabilities.)

Again, it is desirable to process the scanner or printer data as it becomes available, so as to detect any banknote processing with a minimum of delay. Again, there will be some lag time before a detection decision is made. Accordingly, the scanner or printer output will be comprised of two parts, one without the tracer data, and another with the tracer data.

Banknotes presently include various visible structures that can be used as aids in banknote detection (e.g. the seal of the issuing central bank, and various geometrical markings). In accordance with a further aspect of the present invention, a banknote is analyzed by an integrated system that considers both the visible structures and watermark-embedded data.

Visible banknote structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449.

In photocopiers (and the like) equipped to detect both visible and watermarked banknote markings, the detection of either causes one or more of the above-noted banknote responses to be initiated.

Again, scanners and printers can be equipped with a similar capability—analyzing the data for either of these banknote hallmarks. If either is detected, the software (or hardware) responds accordingly.

Identification of banknotes by watermark data provides an important advantage over recognition by visible structures—it cannot so easily be defeated. A banknote can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

(To provide a comprehensive disclosure without unduly lengthening the following specification, applicants incorporate by reference the patent documents cited above (except application Ser. Nos. 09/234,780 and 60/071,983).)

From the foregoing, it will be recognized that embodiments according to the present invention allow banknotes to be recognized based on optical scan data, and responsive actions taken, thereby reducing the risk of counterfeiting. Other devices, responsive to authentic banknotes, are enabled.

Having described and illustrated the principles of my invention with reference to several illustrative embodiments, it will be recognized that these embodiments are exemplary only and should not be taken as limiting the scope of my invention. Guided by the foregoing teachings, it should be apparent that other watermarking, decoding, and anti-counterfeiting technologies can be substituted for, and/or combined with, the elements detailed above to yield similar effects.

While the invention has been described with reference to embodiments employing regular rectangular arrays of grid points, those skilled in the art will recognize that other arrays of points—neither rectangular nor regular—can alternatively be used.

While the invention has been described with reference to embodiments that scale the embedded energy in accordance with local image characteristics, in other embodiments a manually crafted energy profile can be implemented. That is, a mask defining embedded signal magnitudes at different parts of the image can be manually devised, and employed to tailor the change in luminance in each region.

In view of the many possible embodiments to which the principles of the invention may be put, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A method of marking a financial instrument to convey plural binary bits, thereby facilitating machine-recognition thereof, the financial instrument having a visible structure formed thereon, the method being characterized in that the marking is not apparent to human observers of the document, yet can be detected from image data generated by visible light scanning of the financial instrument.

2. The method of claim 1 wherein the visible structure comprises at least one of a seal and logo.

3. The method of claim 2 wherein the marking comprises a background pattern formed over at least a portion of the financial instrument.

4. The method of claim 1 wherein the financial instrument comprises a paper document.

5. The method of claim 1, wherein the financial instrument comprises legal tender.

6. The method of claim 1, wherein the financial instrument comprises at least one of a credit card, a debit card and an ATM card.

7. A method of marking a security document to convey plural bit information, thereby facilitating machine-recognition thereof through detection of image data generated by visible light scanning of the security document, the marking including a visible pattern formed over at least a portion of the security document, wherein the pattern does not betray the existence of the plural bit information to casual human observers of the document.

8. The method of claim 7, wherein the security document comprises a financial instrument.

9. The method of claim 7 wherein the visible pattern comprises a background pattern.

10. The method of claim 7 wherein the visible pattern comprises a noise-like pattern.

11. The method of claim 7 wherein the plural bit information is redundantly marked on the security document.

12. The method of claim 7 wherein the visible pattern comprises artwork.

* * * * *